United States Patent
Hwang et al.

(10) Patent No.: US 9,992,745 B2
(45) Date of Patent: Jun. 5, 2018

(54) EXTRACTION AND ANALYSIS OF BUFFERED AUDIO DATA USING MULTIPLE CODEC RATES EACH GREATER THAN A LOW-POWER PROCESSOR RATE

(75) Inventors: Kyu Woong Hwang, Taejon (KR); Kisun You, Suwon (KR); Minho Jin, Gyeonggi-do (KR); Peter Jivan Shah, San Diego, CA (US); Kwokleung Chan, San Diego, CA (US); Taesu Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 1064 days.

(21) Appl. No.: 13/483,732

(22) Filed: May 30, 2012

(65) Prior Publication Data

US 2013/0110521 A1    May 2, 2013

Related U.S. Application Data

(60) Provisional application No. 61/554,318, filed on Nov. 1, 2011.

(51) Int. Cl.
*H04M 1/00* (2006.01)
*G10L 19/00* (2013.01)
(Continued)

(52) U.S. Cl.
CPC ......... *H04W 52/028* (2013.01); *H04W 52/02* (2013.01); *G10L 15/02* (2013.01);
(Continued)

(58) Field of Classification Search
CPC ........................... G10L 19/008; G10L 19/005
(Continued)

(56) References Cited

U.S. PATENT DOCUMENTS 5,278,944 A * 1/1994 Sasaki et al. ................. 704/212
5,721,938 A   2/1998 Stuckey
(Continued)

FOREIGN PATENT DOCUMENTS

CN    101083809 A    12/2007
CN    201752079 U    2/2011
(Continued)

OTHER PUBLICATIONS

"Energy Aware Distributed Speech Recognition for Wireless Mobile Devices", Copyright Hewlett-Packard Company 2004, HP Laboratories Palo Alto HPL-2004-106, Jun. 17, 2004, Brian Delaney, Tajana Simunic, Nikil Jayant.*
(Continued)

*Primary Examiner* — Farzad Kazeminezhad
(74) *Attorney, Agent, or Firm* — Toler Law Group, P.C.

(57) ABSTRACT

A processor is configured to transition in and out of a low-power state at a first rate and to operate in a first mode or a second mode. In a particular method, the processor while coupled to a coder/decoder (CODEC) retrieves audio feature data from a buffer after transitioning out of the low-power state. The CODEC is configured to operate at a second rate in the first mode and at a third rate in the second mode, the second rate and the third rate each greater than the first rate. The audio feature data indicates features of audio data received during the low-power state of the processor. A ratio of CODEC activity to processor activity in the second mode is less than the ratio in the first mode.

44 Claims, 10 Drawing Sheets

(51) Int. Cl.
*H04W 52/02* (2009.01)
*G10L 19/005* (2013.01)
*G10L 19/008* (2013.01)
*G10L 15/08* (2006.01)
*G10L 15/02* (2006.01)
*G10L 15/28* (2013.01)
*G10L 19/18* (2013.01)

(52) U.S. Cl.
CPC ............ *G10L 15/28* (2013.01); *G10L 19/005* (2013.01); *G10L 19/008* (2013.01); *G10L 19/18* (2013.01); *G10L 2015/088* (2013.01); *Y02B 60/50* (2013.01)

(58) Field of Classification Search
USPC ........................................................ 704/212
See application file for complete search history.

(56) References Cited

U.S. PATENT DOCUMENTS

| | | | |
|---|---|---|---|
| 5,983,186 | A | 11/1999 | Miyazawa et al. |
| 6,070,140 | A | 5/2000 | Tran |
| 6,253,176 | B1 | 6/2001 | Janek et al. |
| 6,408,272 | B1 | 6/2002 | White et al. |
| 6,594,630 | B1 | 7/2003 | Zlokarnik et al. |
| 6,718,307 | B1 | 4/2004 | Buil et al. |
| 7,567,827 | B2 | 7/2009 | Kim |
| 7,774,626 | B2 | 8/2010 | Fleming |
| 7,818,176 | B2 | 10/2010 | Freeman et al. |
| 8,108,218 | B1 | 1/2012 | Huboi |
| 8,150,700 | B2 | 4/2012 | Shin et al. |
| 8,266,451 | B2 | 9/2012 | Leydier et al. |
| 8,359,020 | B2 | 1/2013 | Lebeau et al. |
| 8,606,293 | B2 | 12/2013 | Kim et al. |
| 8,666,751 | B2 | 3/2014 | Murthi et al. |
| 8,682,667 | B2 | 3/2014 | Haughay |
| 8,798,995 | B1 | 8/2014 | Edara |
| 8,880,405 | B2 | 11/2014 | Cerra et al. |
| 8,924,219 | B1 | 12/2014 | Bringert et al. |
| 9,031,847 | B2 | 5/2015 | Sarin et al. |
| 9,112,989 | B2 | 8/2015 | Lee et al. |
| 9,444,939 | B2 | 9/2016 | Ryan et al. |
| 2002/0046033 | A1 | 4/2002 | Ono et al. |
| 2002/0077830 | A1 | 6/2002 | Suomela et al. |
| 2003/0193964 | A1 | 10/2003 | Bae et al. |
| 2004/0002862 | A1 | 1/2004 | Kim et al. |
| 2004/0054532 | A1 | 3/2004 | Staiger |
| 2005/0091052 | A1 | 4/2005 | Chang et al. |
| 2006/0074658 | A1 | 4/2006 | Chadha |
| 2007/0254680 | A1 | 11/2007 | Nassimi |
| 2008/0168189 | A1 | 7/2008 | Aldaz et al. |
| 2008/0221891 | A1 | 9/2008 | Konig et al. |
| 2009/0055005 | A1 | 2/2009 | Oxman et al. |
| 2009/0070119 | A1 | 3/2009 | Yoo et al. |
| 2009/0209300 | A1* | 8/2009 | Furbeck ............... H04M 1/253 455/574 |
| 2009/0271190 | A1 | 10/2009 | Niemisto et al. |
| 2011/0245946 | A1 | 10/2011 | Kim et al. |
| 2011/0246206 | A1 | 10/2011 | Kim et al. |
| 2012/0010890 | A1 | 1/2012 | Koverzin |
| 2012/0224706 | A1 | 9/2012 | Hwang et al. |
| 2013/0054243 | A1 | 2/2013 | Ichikawa |
| 2014/0214429 | A1 | 7/2014 | Pantel |
| 2015/0162002 | A1 | 6/2015 | Liu et al. |
| 2017/0116992 | A1 | 4/2017 | Liu et al. |

FOREIGN PATENT DOCUMENTS

| | | |
|---|---|---|
| EP | 1879000 A1 | 1/2008 |
| EP | 1978765 A1 | 10/2008 |
| GB | 2342828 A | 4/2000 |
| JP | H07121195 A | 5/1995 |
| JP | H07244494 A | 9/1995 |
| JP | H10312194 A | 11/1998 |
| JP | 2000315097 A | 11/2000 |
| JP | 2004226698 A | 8/2004 |
| JP | 2004265217 A | 9/2004 |
| JP | 2004294946 A | 10/2004 |
| JP | 2005070367 A | 3/2005 |
| JP | 2007219207 A | 8/2007 |
| JP | 2007255897 A | 10/2007 |
| JP | 2008309864 A | 12/2008 |
| JP | 2009265219 A | 11/2009 |
| JP | 2010268324 A | 11/2010 |
| KR | 20010063844 A | 7/2001 |
| KR | 20030081835 A | 10/2003 |
| KR | 100447667 B1 | 9/2004 |
| KR | 100744301 B1 | 7/2007 |
| WO | 2004084443 A1 | 9/2004 |
| WO | 2008004037 A1 | 1/2008 |
| WO | 2010078386 A1 | 7/2010 |
| WO | 2011037264 A1 | 3/2011 |
| WO | 2011059781 A1 | 5/2011 |

OTHER PUBLICATIONS

Boucheron, Laura E., et al., "Hybrid Scalar/Vector Quantization of Mel-Frequency Cepstral Coefficients for Low Bit-Rate Coding of Speech", 2011 IEEE Data Compression Conference (DCC), Mar. 2011, pp. 103-112.
International Search Report and Written Opinion—PCT/US2012/057078—ISA/EPO—May 16, 2013, 17 pages.
Alon, G., "Key-Word Spotting the Base Technology for Speech Analytics," White Paper, Natural Speech Communication Ltd., Jul. 2005, 8 pages.
Bourke, P.J., "A Low-Power Hardware Architecture for Speech Recognition Search," Carnegie Mellon University, Pittsburgh, PA, May 2011, 166 pages.
Ceron, I.F.C., et al., "A Keyword Based Interactive Speech Recognition System for Embedded Applications," School of Innovation, Design and Engineering, Malardalen University, Vasteras, Sweden, Jun. 2011, 96 pages.

* cited by examiner

ЕXTRACTION AND ANALYSIS OF
BUFFERED AUDIO DATA USING MULTIPLE
CODEC RATES EACH GREATER THAN A
LOW-POWER PROCESSOR RATE

I. CROSS-REFERENCE TO RELATED APPLICATIONS

The present application claims priority from U.S. Provisional Application No. 61/554,318 filed Nov. 1, 2011, the content of which is incorporated by reference in its entirety.

II. FIELD

The present disclosure is generally related to extraction and analysis of audio feature data.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

As the number of devices incorporated into a wireless telephone increases, battery resources at the wireless telephone may become scarcer. To conserve battery resources, a wireless telephone may transition into an "idle" or "sleep" mode after a period of inactivity. The wireless telephone may transition back into an "active" or "wake" mode in response to a network event (e.g., receiving a telephone call) or user input (e.g., a user pushing a button of the wireless telephone). Some devices may also include the ability to "wake up" in response to audio input, such as voice commands. However, to implement such functionality, processor(s) and other components of a device may run in an "always on" mode and may continuously consume power, which may decrease an overall battery life of the device.

IV. SUMMARY

A low-power system and method of extracting and analyzing audio feature data is disclosed. For example, the techniques disclosed herein may enable sound-sensing functionality in an electronic device (e.g., wireless telephone) with reduced power consumption. The electronic device may include a low-power coder/decoder (CODEC) coupled to a processor (e.g., an audio digital signal processor (DSP)). The system may have multiple operational modes, each mode corresponding to a different ratio of CODEC activity to processor activity. For example, in a first mode, the CODEC may operate continuously and the processor may be duty-cycled at a first rate. For example, the processor may operate in accordance with a 10% duty cycle (i.e., active 10% of the time and idle 90% of the time). In a second mode, the CODEC may also be duty-cycled. The CODEC may be duty-cycled at different rates in different modes. In some modes, the CODEC's activity may be greater than or equal to the processor's activity. In other modes, such as when the processor has a heavy computational load, the processor's activity may be greater than the CODEC's activity. The CODEC may receive audio data (e.g., from a microphone of the device) and extract audio features from the audio data. The processor may analyze the audio features and may perform one or more actions based on the analysis. For example, the processor may activate one or more other components of the electronic device based on the analysis.

In a particular embodiment, a method includes transitioning out of a low-power state at a processor. The method also includes the processor retrieving audio feature data from a buffer after transitioning out of the low-power state. The audio feature data indicates features of audio data received during the low-power state of the processor. In some embodiments, the audio data may have been received and the audio feature data may have been extracted by a CODEC coupled to the processor while the processor was in the low-power state.

In another particular embodiment, a method includes receiving a frame of audio data at a CODEC. The method also includes extracting audio feature data from the frame of audio data. The method further includes storing the extracted audio feature data in a buffer to be accessible by a duty-cycled processor during an active state of the duty-cycled processor.

In another particular embodiment, an apparatus includes a processor and a plurality of filters configured to filter one or more frames of audio data to produce energies of filtered audio data (independently of whether the processor is in a low-power state or in an active state). The apparatus also includes a converter configured to generate audio feature data based on the energies of the filtered audio data. The apparatus further includes a transformer configured to apply a transform function to the audio feature data to generate transformed data. The processor is configured to perform one or more operations on the transformed data after transitioning out of the low-power state to the active state.

In another particular embodiment, an apparatus includes a processor configured to dynamically switch between operating in a first mode and operating in a second mode based on an application context of the processor. The processor is also configured to retrieve and process audio feature data from a buffer after transitioning out of a low-power state. The audio feature data indicates features of audio data received by a CODEC while the processor is in the low-power state. A ratio of CODEC activity to processor activity in the first mode is greater than a ratio of CODEC activity to processor activity in the second mode.

In another particular embodiment, a non-transitory processor-readable medium includes instructions that, when executed by a processor, cause the processor to dynamically switch between operating in a first mode and operating in a second mode. A ratio of CODEC activity to processor activity in the first mode is greater than a ratio of CODEC activity to processor activity in the second mode. The instructions, when executed, also cause the processor to transition out of a lower-power state during a duty cycle and to analyze audio feature data that is extracted during the low-power state. The instructions, when executed, further cause the processor to transition back into the low-power state.

Particular advantages provided by at least one of the disclosed embodiments include an ability of an electronic device to extract and analyze audio feature data by use of an always on low-power CODEC (or a duty-cycled CODEC) and a duty-cycled processor. For example, the audio feature data may indicate characteristics of audio data received by the CODEC while the duty-cycled processor is in a low-power state. The extraction and analysis of the audio feature data may be performed with reduced power consumption compared to systems that include an always on CODEC and an always on audio processor. The analysis of the audio feature data may trigger various operations, such as activating a touchscreen or other component of the electronic device.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
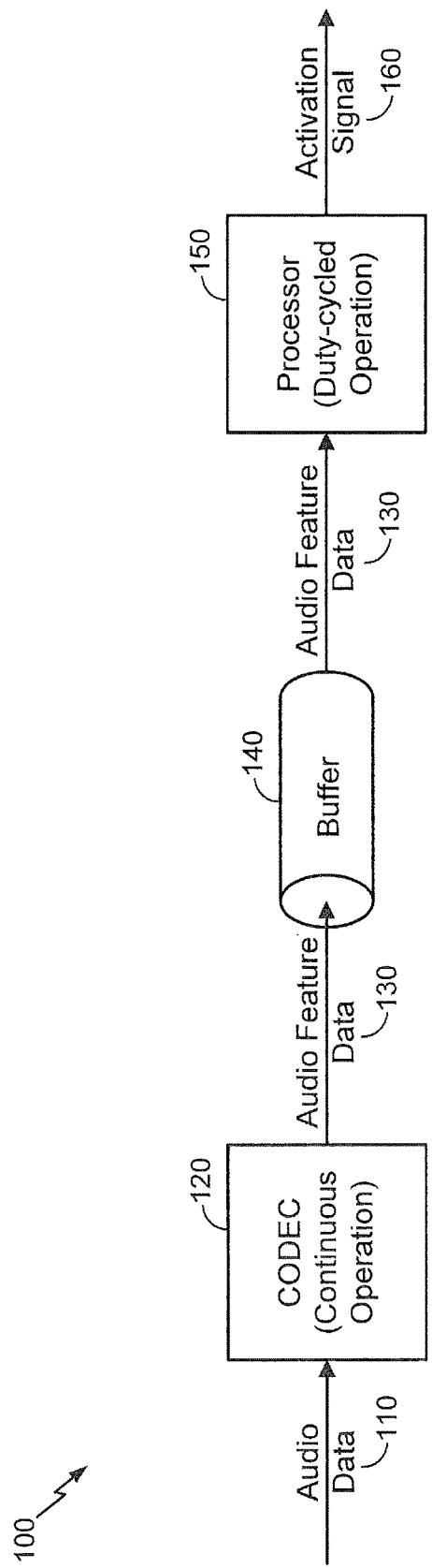
FIG. 1 is a diagram to illustrate a particular embodiment of a system that is operable to extract and analyze audio feature data.

Referring to FIG. 1, a particular embodiment of a system that is operable to extract and analyze audio feature data is shown and generally designated 100. The system 100 includes a coder/decoder (CODEC) 120 coupled to a processor 150. In a particular embodiment, the processor 150 may be a digital signal processor (DSP), such as an audio DSP. In some embodiments, a buffer 140 may be located between the CODEC 120 and the processor 150, as shown. In alternate embodiments, the buffer 140 may be internal to the CODEC 120 or the processor 150, as further described with reference to FIGS. 2-3.

In a particular embodiment, the CODEC 120 may operate continuously and receive audio data 110. For example, the audio data 110 may be generated by a microphone or other sound input device coupled to the CODEC 120. The audio data 110 may be "raw" (i.e., unprocessed and/or uncompressed) audio data. The CODEC 120 may be configured to extract audio features from the audio data 110, thereby generating audio feature data 130. In a particular embodiment, the audio feature data 130 may be substantially smaller in size than the audio data 110. The CODEC 120 may store the audio feature data 130 in the buffer 140 (e.g., a random access memory (RAM) buffer). In a particular embodiment, the audio feature data 130 may indicate particular characteristics of the audio data 110, such as pitch, tone, volume, and/or rhythmic characteristics. The CODEC 120 may also discard the audio data 110 after extracting the audio feature data 130.

The processor 150 may operate in accordance with a duty cycle. To illustrate, if the processor 150 operates in accordance with a 10% duty cycle, the processor 150 is "active" (i.e., in a high-power state) 10% of the time and is "idle" (i.e., in a low-power state) 90% of the time. In a particular embodiment, the processor 150 may periodically transition between the active state and the idle state in response to expiration of a programmable time period (e.g., the duty cycle of the processor 150 may be programmable). The duty-cycled processor 150 may thus consume less power than an "always on" processor.

After transitioning out of the low-power state, the processor 150 may retrieve the audio feature data 130 from the buffer 140 and analyze the retrieved audio feature data 130. The processor 150 may perform one or more operations based on a result of the analysis. For example, when the system 100 is integrated into an electronic device, such as a wireless telephone, the processor 150 may generate an activation signal 160 based on the analysis of the audio feature data 130 to activate one or more components of the electronic device (e.g., an application processor or a portion of a mobile station modem (MSM), as further described with reference to FIG. 10).

During operation, the CODEC 120 may continuously receive frames of the audio data 110 and store the audio feature data 130 extracted from the audio data 110 in the buffer 140. For example, each frame of the audio data 110 may be 20 ms long. In a particular embodiment, newer audio feature data 130 may overwrite older audio feature data 130 in the buffer 140 in accordance with a first-in-first-out policy.

It should be noted that instead of operating continuously as depicted in FIG. 1, the CODEC 120 may instead be duty-cycled. For example, if the CODEC 120 is less power-efficient than desired or is a "legacy" CODEC, the CODEC 120 may be duty-cycled. Generally, even though the CODEC 120 is duty-cycled, the CODEC 120 may be more active than the processor 150. Thus, the system 100 may support multiple operational modes. In a first mode, the CODEC 120 may perform more frequent audio signal processing and may presumably consume more power. In a second mode, the CODEC 120 may perform less frequent audio signal processing and may presumably consume less power. The processor 150 may have the same duty cycle in the first mode and in the second mode.

It will be appreciated that various implementations may be supported by the dual-mode (or multi-mode) system 100, each mode having a different ratio of CODEC activity to processor activity. For example, a higher activity mode may involve the CODEC 120 operating continuously and the processor 150 duty-cycled at a first rate (e.g., D1), and a lower activity mode may involve the CODEC 120 duty-cycled at a second rate (e.g., D2) that is greater than or equal to the first rate (e.g., D2>=D1). As another example, the higher activity mode may involve the CODEC 120 duty-cycled at a first rate (e.g., D1) and the processor 150 duty-cycled at a second rate (e.g., D2), and the lower activity mode may involve the CODEC 120 duty-cycled at a third rate (e.g., D3) and the processor 150 duty-cycled at the second rate (e.g., D2). The first rate may be substantially greater than the second rate (e.g., D1>>D2) and the third rate may be greater than or equal to the second rate (e.g., D3>=D2). Selected implementations may also support modes in which CODEC activity is less than or equal to processor activity, such as during periods of heavy processor computational load. For example, the third rate may be less than or equal to the second rate (e.g., D3<=D2).

Depending on how frequently the CODEC 120 and the processor 150 are active, the system 100 may be effectively working in a store-and-forward mode or in a direct transfer mode. In the store-and-forward mode, the processor 150 may empty the buffer 140 upon transitioning out of the low-power state. That is, the processor 150 may retrieve audio feature data 130 corresponding to every frame (or multiple frames) of audio data 110 received by the CODEC 120 while the processor 150 was in the low-power mode. In the direct transfer mode, the processor 150 may retrieve audio feature data 130 corresponding to a single frame of the audio data 110 (e.g., a most recently received frame of the audio data 110). In a particular embodiment, the processor 150 may dynamically switch between operating in the store-and-forward mode and in the direct transfer mode, and/or between a higher activity mode and a lower activity mode (where the higher activity mode has a higher CODEC activity to processor activity ratio than the lower activity mode) based on an application context of the processor 150, as further described with reference to FIGS. 2 and 4.

After retrieving the audio feature data 130, the processor 150 may analyze the audio feature data 130 and may generate the activation signal 160 based on the analysis. For example, when the analysis of the audio feature data 130 identifies a particular voice input command (e.g., "wake up"), the processor 150 may generate the activation signal 160 to activate various components of an electronic device.

The system 100 of FIG. 1, which includes a duty-cycled processor, may thus enable audio feature extraction and analysis at lower power than a system having an always-on CODEC and an always-on processor. Further, by buffering audio features instead of raw audio data, the system 100 of FIG. 1 may perform audio analysis with a reduced amount of memory usage.

Figure 2:
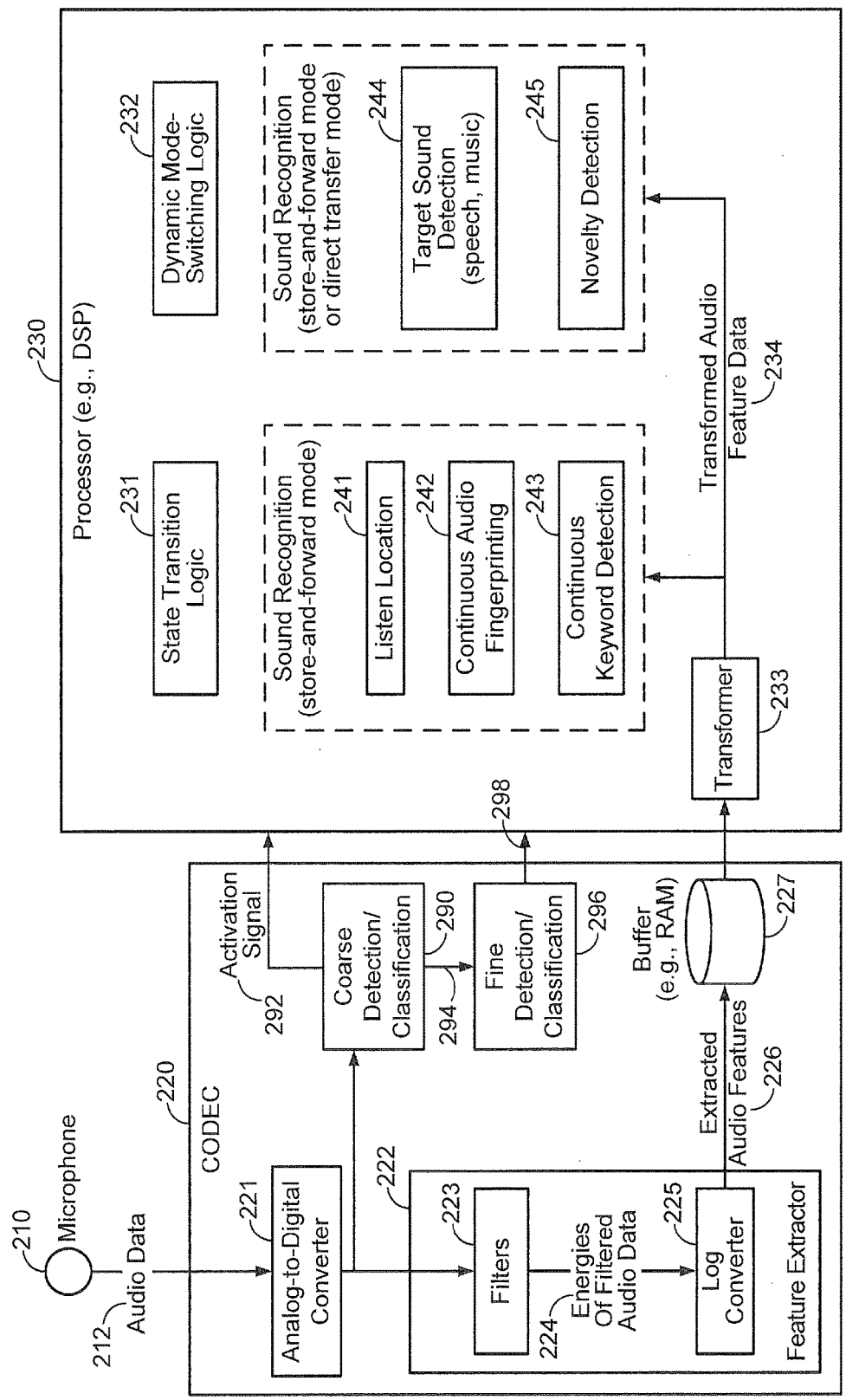
FIG. 2 is a diagram to illustrate another particular embodiment of a system that is operable to extract and analyze audio feature data.

Referring to FIG. 2, another particular embodiment of a system that is operable to extract and analyze audio feature data is shown and generally designated 200. The system 200 may include a CODEC 220 (e.g., the CODEC 120 of FIG. 1) coupled to a processor 230 (e.g., the processor 150 of FIG. 1). The CODEC 220 may also be coupled to a sound input device, such as an illustrative microphone 210.

The CODEC 220 may include an analog-to-digital converter (ADC) 221 that receives analog audio data 212 from the microphone 210 and converts the analog audio data 212 into digital audio data. In an alternate embodiment where the microphone 210 produces digital audio data, the ADC may not be present.

The CODEC 220 may also include a feature extractor 222 configured to extract audio features 226 from the audio data 212. In a particular embodiment, the feature extractor 222 may include a plurality of filters 223 that filter the audio data 212 to generate energies 224 (e.g., mel-band energies) of filtered audio data. For example, the filters 223 may be mel-band filters, where each mel-band filer corresponds to a different portion of a human perception frequency scale (e.g., octave). To illustrate, the filters 223 may include 22 mel-band filters that generate mel-band energies 224 corresponding to 22 octaves. In an alternate embodiment, the feature extractor 222 may perform fast Fourier transform (FFT)-based feature extraction.

The feature extractor 222 may also include a log converter 225. The log converter 225 may apply a logarithm function to the energies 224 of the filtered audio data to generate the extracted audio features 226. The extracted audio features 226 may be stored in a buffer (e.g., RAM buffer) 227. The extracted audio features 226 may be substantially smaller in size than the audio data 212 with compactly designed audio features (e.g., 22 log mel-band energies from each 20 ms frame). To illustrate, the audio data 212 may have a 16 kHz, 16 bit resolution. 200 ms (e.g., corresponding to 10 frames) of the audio data 212 may occupy 6400 bytes of space. However, extracted audio features 226 for the 10 frames may occupy only 220 bytes of space (10 frames×22 features per frame×1 byte per feature). Thus, by storing the extracted audio features 226 instead of the raw audio data 212 in the buffer 227, the buffer 227 may be kept relatively small and may consume relatively less power.

The processor 230 may include state transition logic 231. In a particular embodiment, the state transition logic 231 may transition the processor 230 in and out of a low-power state (e.g., in accordance with a duty cycle). Upon transitioning out of the low-power state, the processor 230 may retrieve the extracted audio features 226 from the buffer 227. A transformer 233 may apply a transform function to the extracted audio features 226 to generate transformed audio feature data 234. In a particular embodiment, the transformer 233 may be configured to apply a discrete cosine transform (DCT) function. To illustrate, transforming the extracted audio features 226, where the extracted audio features 226 include features corresponding to 22 mel-bands per frame, may generate 12 mel-frequency cepstral coefficients (MFCCs) per frame by taking 12 elements of DCT coefficients.

The processor 230 may also include one or more sound recognition modules 241-245 configured to analyze the transformed audio feature data 234. In a particular embodiment, which sound recognition modules 241-245 are active may depend on what mode the processor 230 is operating in. To illustrate, dynamic mode-switching logic 232 at the processor 230 may dynamically switch operation of the processor 230 based on context (e.g., application context). For example, when a device including the system 200 of FIG. 2 executes an application or other operation that involves listen location, continuous audio fingerprinting, and/or continuous keyword detection, the logic 232 may cause the processor 230 to operate in a store-and-forward mode (e.g., in which features from multiple frames of audio data are processed each time the processor 230 is active) and the modules 241-243 may be active. As another example, when the device executes an application that involves target sound detection (e.g., detection of specific music or speech) and/or novelty detection, the logic 232 may cause the processor 230 to operate in either the store-and-forward-mode or in a direct transfer mode (e.g., in which features from a single frame of audio data are processed each time the processor is active), and the modules 244-245 may be active. In alternate embodiments, the dynamic mode-switching logic 232 may switch operation of the processor 230 based on other factors, including, for example, characteristics of the audio data 212 and/or the audio features 226.

The listen location module 241 may convert input sound into audio signatures. The signatures may be sent to a server (not shown), and the server may compare the signatures to signatures received from other devices. If signatures from different devices are similar, the server may determine that the different devices are in the same acoustical space, which may indicate that the different devices are in the same physical location, listening to the same content, or have a similar context as determined by surrounding sound. For example, listen location may be used in a social network service to group people and/or share an item with a group of people.

The continuous audio fingerprinting module 242 may attempt to detect the existence of pre-enrolled (e.g., predetermined) sound snapshots. Unlike target sound or environment detection, continuous audio fingerprinting may robustly detect perceptually identical sound snapshots in the presence of sound-quality distortions, such as distortion related to channel degradation, equalization, speed change, digital-to-analog or analog-to-digital conversion, etc. Continuous audio fingerprinting may thus find application in music and broadcast identification scenarios.

The continuous keyword detection module 243 may receive sound input and may detect the existence of pre-enrolled (e.g., predetermined) keyword sets. Continuous keyword detection may be performed in a relatively low-power state and may activate predefined applications based on detected keywords. The predetermined keyword sets may be programmable by an application processor. In a particular embodiment, models for keywords may be downloaded by the application processor. Continuous keyword detection may thus enable voice-activation commands without the use of a dedicated voice command button or non-verbal user input.

The target sound detection module 244 may detect a type of sound and may notify corresponding applications to respond to the sound. For example, upon detecting speech, target sound detection may cause a voice recording application to record the speech. As another example, upon detecting music, target sound detection may cause an application to identify properties of the music, such as song title, artist name, and album name.

The novelty detection module 245 may detect changes in input audio that correspond to changes in location and/or changes in activity. Novelty detection may be used in conjunction with other sound recognition operations (e.g., listen location and target sound detection) to identify location and sound activity, and to log the corresponding time for subsequent usage and analysis. Novelty detection may also be used to activate other sound recognition operations when there is a noticeable change in environmental acoustics.

During operation, the CODEC 220 may continuously receive frames of the audio data 212 from the microphone, extract the audio features 226 from the audio data 212, and store the audio features 226 in the buffer 227. The processor 230 may transition in and out of a low-power state in accordance with a duty cycle. After transitioning out of the low-power state, the processor 230 may retrieve and transform audio features 226 corresponding to a plurality of frames of the audio data 212 (when operating in the store-and-forward mode) or corresponding to a single frame of audio data 212 (when operating in the direct transfer mode). The processor 230 may also transition between operating in a higher activity mode and in a lower activity mode, as described with reference to FIG. 1. When active, the processor 230 may analyze the transformed audio feature data 234 via one or more of the sound recognition modules 241-245, and may determine whether to activate an application processor and/or component(s) of a mobile station modem (MSM) or other component based on the analysis.

In a particular embodiment, the system 200 of FIG. 2 may provide a common listening service that can serve multiple higher-level applications (e.g., a music recognition application, a keyword detection application, etc.). For example, the common listening service may provide (e.g., via an application programming interface (API), shared memory, etc.) higher-level applications with the results of sound recognition operations performed by the processor 230. The common listening service may reduce interoperability issues and may be more power-efficient than systems in which each higher-level application has its own listening engine.

The system 200 of FIG. 2 may thus enable audio feature extraction and analysis with reduced power consumption. For example, relatively low-power operations, such as analog-to-digital conversion and feature extraction, may be incorporated into a low-power always-on CODEC (or a duty-cycled CODEC), and higher-power operations, such as data transformation and sound recognition, may be incorporated into a duty-cycled DSP and may be performed intermittently.

In a particular embodiment, the system 200 of FIG. 2 may provide a low-power user interface at an electronic device that includes activation of high-power components by low-power components. To illustrate, the system 200 may support audible (e.g., 0-16 kHz sampling rate), beacon (e.g., 16-24 kHz sampling rate), and ultrasound (e.g., >24 kHz sampling rate) input. To support multiple types of input, the microphone 210 may be capable of receiving audio, beacon, and ultrasound signals. Alternately, additional microphones or components may be incorporated into the system 200 for ultrasound and/or beacon detection. Components used to convert sound signals to electrical signals may include, but are not limited to, microphones, piezoelectric sensors, and ultrasound transducers. The low-power CODEC 220 may perform coarse detection/classification 290 on received signals. It should be noted that although FIG. 2 illustrates the coarse detection/classification 290 being performed on the output of the analog-to-digital converter 221, alternate embodiments may include performing the coarse detection/classification 290 on analog signals instead. Depending on the results of the coarse detection/classification 290, the CODEC 220 may activate the higher-power processor 230 via an activation signal 292. For example, the processor 230 may be activated if the coarse detection/classification 290 indicates that ultrasound input has been received.

It should be noted that although FIG. 2 illustrates a two-level activation hierarchy (i.e., the CODEC 220 and the processor 230), any number of levels may be implemented. For example, in a three level hierarchy, a low-power digital/analog circuit may perform coarse detection to determine whether to activate a higher-power front-end processing unit, and the front-end processing unit may perform fine detection to determine whether to activate an even higher-power main processing unit that performs final detection and executes applications/user interface components. In a particular embodiment, the digital/analog circuit and the front-end processing unit may be integrated into the CODEC 220 and the main processing unit may be integrated into the processor 230. To illustrate, the coarse detection/classification block 290 may be integrated into a digital/analog circuit of the CODEC 220 and may selectively activate a fine detection/classification block 296 in a front-end unit of the CODEC 220 via a first activation signal 294. The fine detection/classification block 296 may activate a final detection/classification block at the processor 230 via a second activation signal 298. Staggered hierarchical activation of higher-power components by lower-power components may improve battery life at an electronic device.

Various detection and classification methods may be used at the system 200, and more than one method may be used at once. In a particular embodiment, root mean square (RMS) or band-power classification may be used to determine whether a received signal includes data in the audio, beacon, and/or ultrasound ranges. A time domain method may include use of filter banks with signal level detection, where each filter is designed to extract a particular type of sound and where filter output levels are compared to thresholds to qualify sounds. A frequency domain method may include performing a FFT of mel-spaced cepstral coefficients to derive frequencies used to classify the input signal. A sound content method may involve pattern matching by correlating input signals with a known pattern (e.g., to determine whether input signals are received from an ultrasound digital stylus). A model-based approach may include computing a probability that the input signal matches a predetermined music or speech model. Novelty detection may involve detecting changes in input sound characteristics. When a change is detected, applications may be notified to update context information (e.g., whether a device is indoors or outdoors). For example, when a user goes from an indoor environment to an outdoor environment, the resulting change in input sound characteristics may result in an application at the user's mobile phone increasing a ringer volume of the phone.

Examples of use cases for the system 200 of FIG. 2 and/or components thereof include, but are not limited to: voice recognition to control devices (e.g., televisions, game consoles, computers, and phones), audio recognition for contextual awareness, acoustic and pulse recognition for a digital stylus (e.g., an ultrasound digital stylus for handwriting input to digital devices via transmission of ultrasound), ultrasound gesture or proximity detection, device-to-device positioning using ultrasound, acoustic touch detection, sound beacons to identify locations of devices, content identification by audio fingerprinting, peer discovery and proximity sensing by sound matching, and location estimation by sound matching.

It should be noted that although FIGS. 1-2 depict feature extraction performed by a CODEC and data transformation performed by a processor, this is for illustration only. In alternate embodiments, different functionality may be performed by different hardware components. For example, referring to FIG. 3, particular embodiments of dividing operations between the CODEC 220 of FIG. 2 and the processor (e.g., DSP) 230 of FIG. 2 are shown and generally designated 300.

In a first embodiment, the CODEC/DSP boundary may be located at 302. In this first embodiment, the CODEC may include an ADC 321 and the output of the ADC 321 may be buffered. The DSP may perform feature extraction (e.g., via mel-band filters 323 and a log converter 325), data transformation (e.g., via a DCT transformer 333), and sound recognition (e.g., via sound recognition modules 340).

In a second embodiment, the CODEC/DSP boundary may be located at 304. Thus, in this second embodiment, feature extraction may be partially performed by the CODEC and partially performed by the DSP. The output of the mel-band filters 232 may be buffered. Data transformation and sound recognition may be performed by the DSP.

In a third embodiment, the CODEC/DSP boundary may be located at 306. It will be noted that the third embodiment may correspond to the system 100 of FIG. 1 and the system 200 of FIG. 2. In this third embodiment, feature extraction may completely be performed by the CODEC, and the output of the log converter 325 may be buffered. Data transformation and sound recognition may be performed by the DSP.

In a fourth embodiment, the CODEC/DSP boundary may be located at 308. In this fourth embodiment, both feature extraction and data transformation may be performed by the CODEC, and the output of the DCT transformer 333 may be buffered. Sound recognition may be performed by the DSP.

Figure 3:
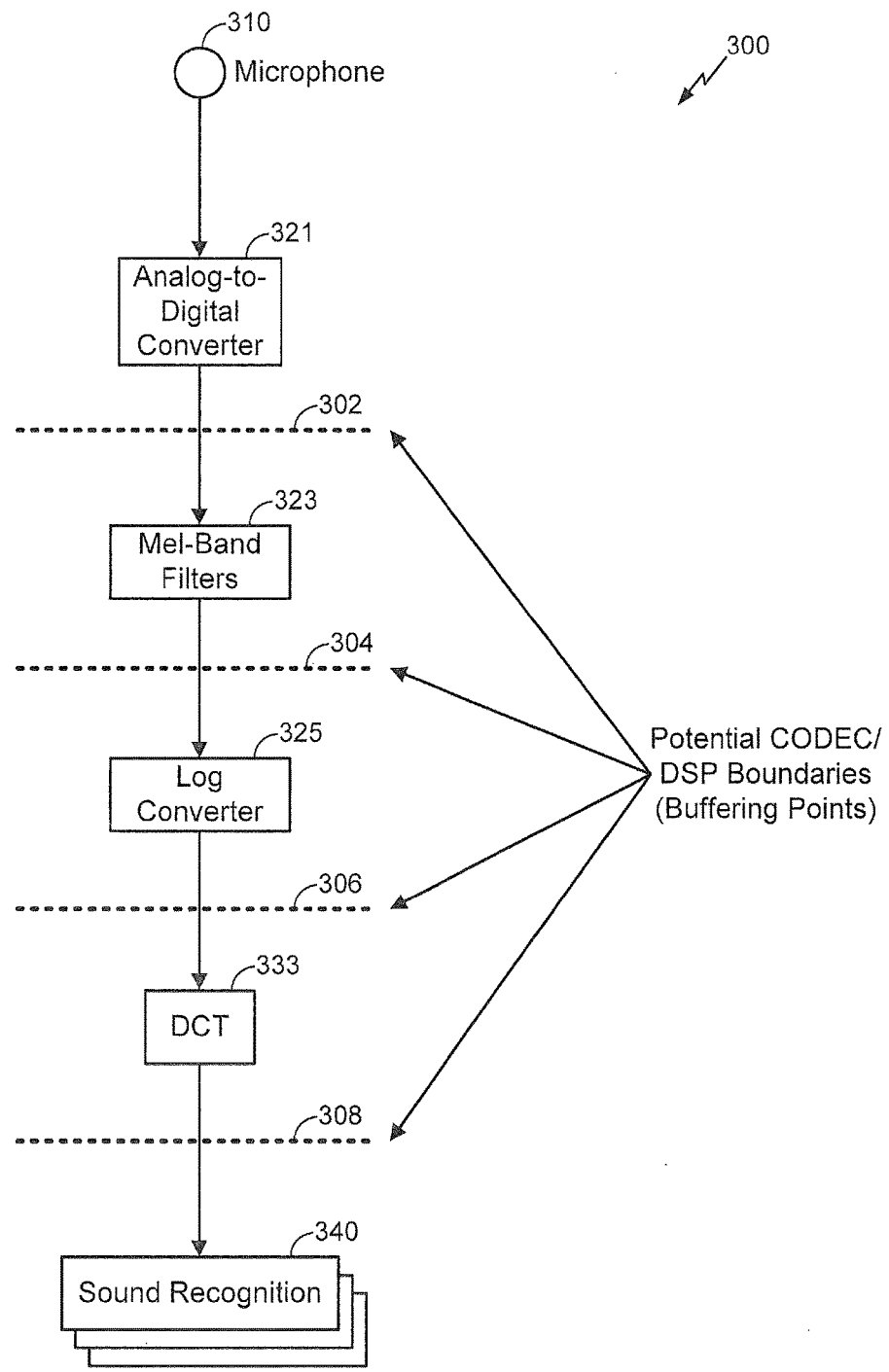
FIG. 3 is a diagram to illustrate particular embodiments of divided operations between the CODEC of FIG. 2 and the processor of FIG. 2.

As described with reference to FIGS. 1-2, the disclosed techniques may involve use of an always-on low-power CODEC (or a duty-cycled CODEC) and a duty-cycled processor that consumes more power than the CODEC when "active." Thus, it may be desirable to incorporate relatively low-power functionality into the CODEC and leave relatively high-power functionality in the DSP. As shown in FIG. 3, the CODEC/DSP boundary and buffering point may be flexibly located in any of multiple locations. In a particular embodiment, the location of the CODEC/DSP boundary may be determined during design and testing of an electronic device and may be based on factors such as overall power consumption and performance of the electronic device.

Figure 4:
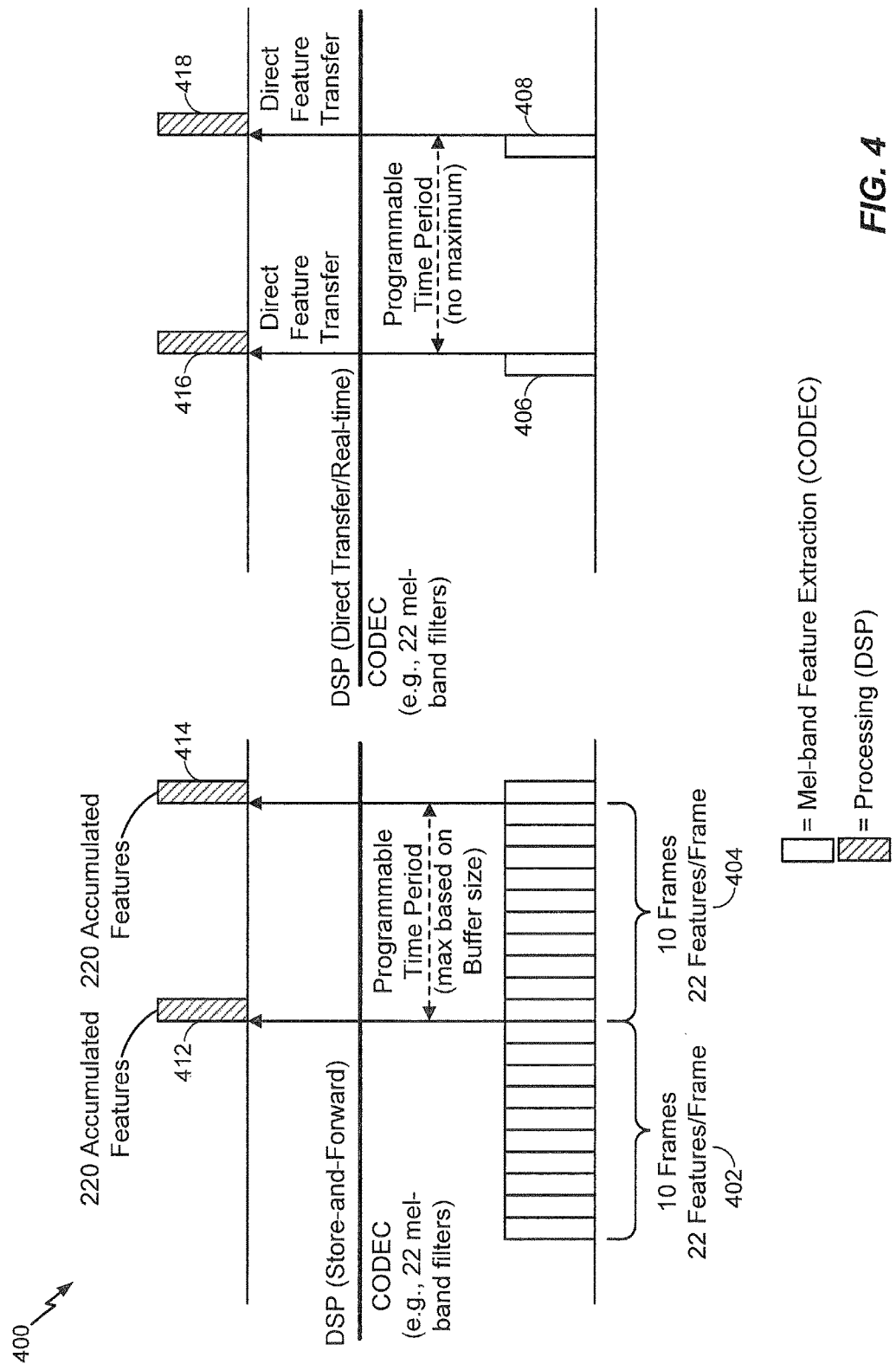
FIG. 4 is a diagram to illustrate a particular embodiment of operation at the system of FIG. 1 or the system of FIG. 2.

Referring to FIG. 4, a particular illustration of operation at the system 100 of FIG. 1 or the system 200 of FIG. 2 is shown and generally designated 400. For example, FIG. 4 compares DSP operation in store-and-forward mode and in direct transfer (e.g., real-time or near real-time) mode.

When the DSP operates in store-and-forward mode, a CODEC including a plurality of filters (e.g., 22 mel-band filters) may extract and accumulate 22 features per frame for each frame of received audio data, as indicated at 402, while the DSP is in a low-power state. When the DSP transitions out of the low-power state, the DSP may retrieve and analyze the accumulated features, as indicated at 412. In the particular embodiment illustrated in FIG. 4, the DSP transitions out of the low-power state after audio features corresponding to 10 frames of audio data have been extracted by the CODEC. Thus, in the store-and-forward mode, the DSP may retrieve and process 220 audio features (corresponding to 10 frames) prior to transitioning back to the low-power state. This process may continue, as indicated by a subsequent extraction of features, at 404, and processing of retrieved features, at 414.

To avoid or reduce audio feature loss and buffer overflow, when operating in the store-and-forward mode, the DSP may transition out of the low-power state in accordance with a programmable time period. The programmable time period may be less than or equal to a maximum time period that is based on the size of the buffer. Thus, in the store-and-forward mode, audio features from each frame received by the CODEC may eventually be analyzed by the DSP. In a particular embodiment, DSP-CODEC handshaking or another technique may be utilized to maintain synchronization between the DSP and the CODEC and to reduce buffer overflow/underflow.

When the DSP operates in the direct transfer mode, audio features (indicated at 406) corresponding to a most recently received audio frame may be retrieved and processed by the DSP, as indicated at 416. Because there is effectively a "direct transfer" of audio features to the DSP, the audio features may be buffered for a very short amount of time or may not be buffered at all, and the duty cycle of DSP may be programmed independent of the size of the buffer. Thus, in the direct transfer mode, the DSP may retrieve and process 22 audio features (corresponding to a single audio frame), prior to transitioning back to the low-power state.

This process may continue, as indicated by subsequent extracted features, at 408, and retrieved features, at 418. Thus, in the direct transfer mode, audio features from only a subset of frames (e.g., one out of every ten frames in the embodiment of FIG. 4) received by the CODEC may be analyzed by the DSP.

It should be noted that the CODEC and the DSP may support additional operating modes as well. Typically, activity of the CODEC may be greater than or equal to activity of the DSP. The various operating modes may correspond to different ratios of CODEC activity to processor activity. Each operating mode may include different settings for the duty cycle of the CODEC (where 100% corresponds to always on), the duty cycle of the DSP, and/or how many frames of audio data are analyzed each time the processor wakes up. The details of the supported operating modes may be determined at design-time and/or manufacturing-time. Which particular operating mode is selected may be determined at run-time based on factors such as application context.

Figure 5:
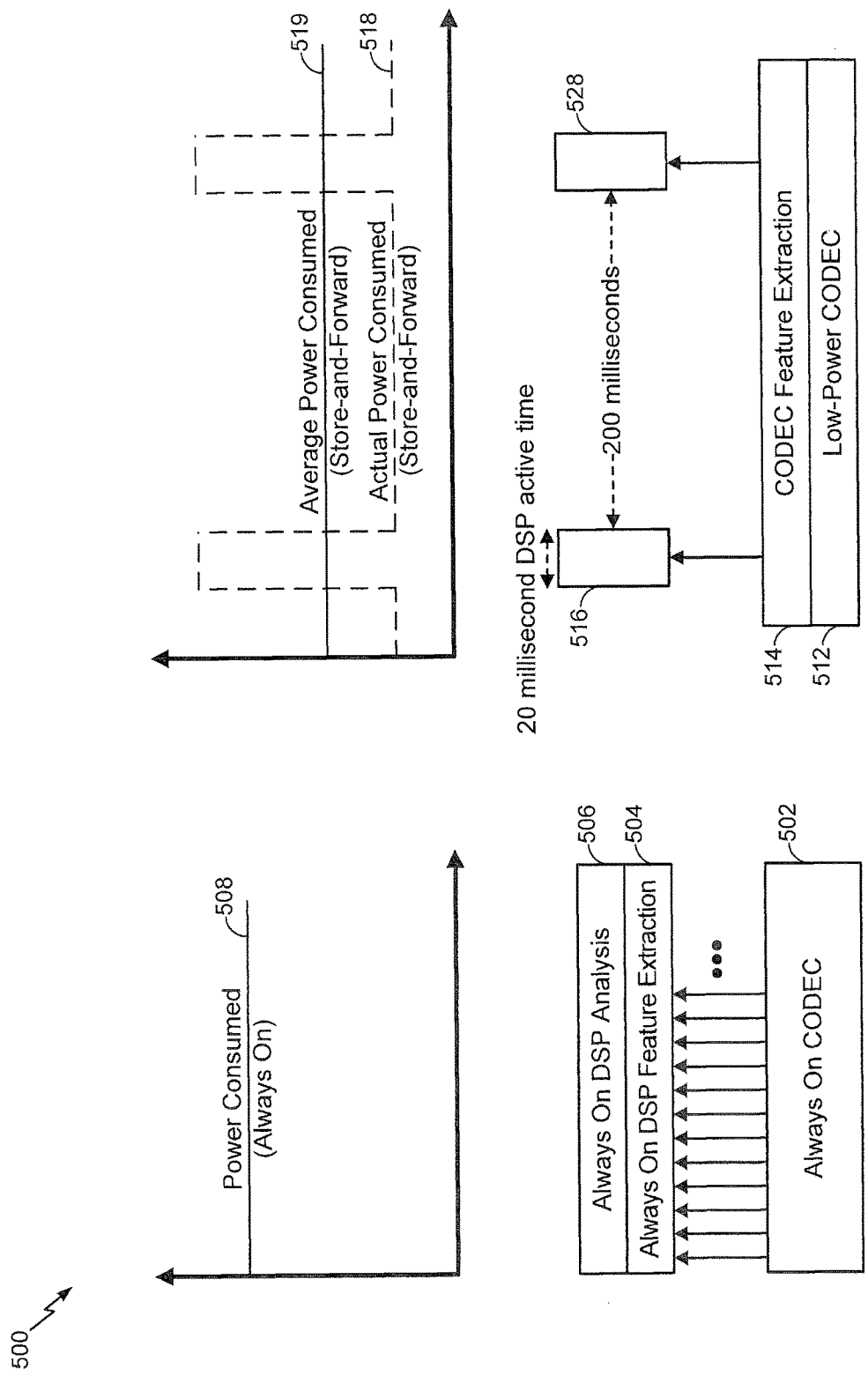
FIG. 5 is a diagram to illustrate a particular embodiment of power consumption at the system of FIG. 1 or the system of FIG. 2.

Referring to FIG. 5, a particular illustration of power consumption at various sound-sensing systems is shown and generally designated 500. More particularly, the left-hand side of FIG. 5 illustrates power consumption at a system that includes an always on CODEC and an always on DSP and the right-hand side of FIG. 5 illustrates power consumption at a system in accordance with the disclosed techniques; such as the system 100 of FIG. 1 or the system 200 of FIG. 2.

The sound-sensing system to the left may include an always on CODEC 502. The system may also include an always on DSP, including always on DSP feature extraction 504 and always on DSP analysis 506. Because the CODEC and the DSP are always on, the power consumed by the system may be represented by a relatively flat curve, as shown at 508.

The sound-sensing system to the right (e.g., the system 100 of FIG. 1 or the system 200 of FIG. 2) may include an always on low-power CODEC 512 and CODEC feature extraction, at 514. The system may also include a duty-cycled DSP. For example, in the particular embodiment of FIG. 5, the DSP has a 20 ms active time and a 200 ms idle time. Thus, although the combination of the CODEC duty-cycled DSP on the right-hand side may consume more power than the system on the left-hand side during the 20 ms active times 516, 518, the combination may consume substantially less power during the 200 ms idle time of the duty-cycled DSP. Power consumption of the right-hand side system may be illustrated by the curve 518. It will be appreciated that average power consumption of the system on the right-hand side of FIG. 5, illustrated by the curve 519, may thus be substantially less than the power consumption of the system on the left-hand side of FIG. 5, illustrated by the curve 508. In some implementations, the CODEC 512 may be duty-cycled as well, as described with reference to FIGS. 1-4.

Figure 6:
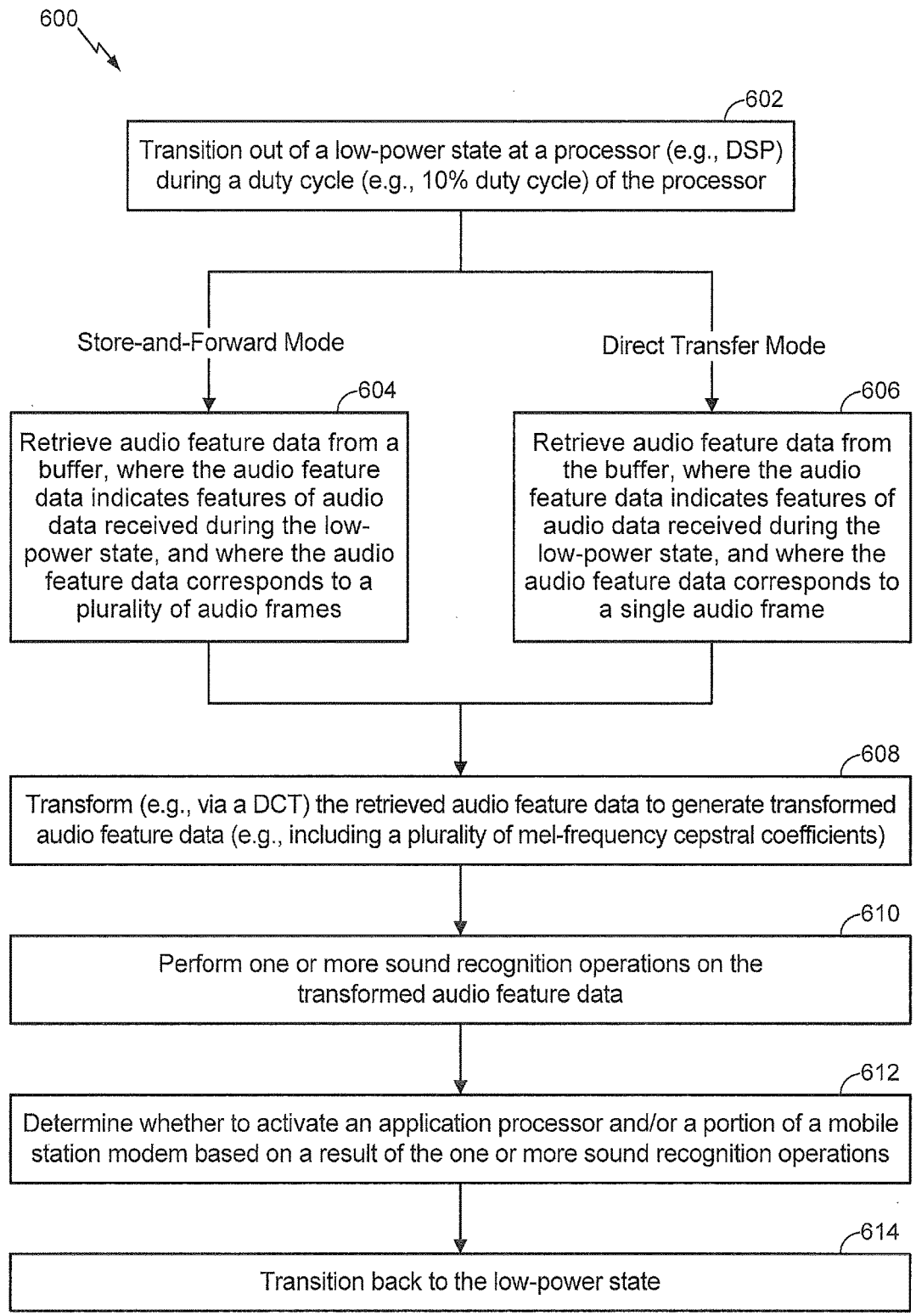
FIG. 6 is a flowchart to illustrate a particular embodiment of a method of performing sound recognition on audio feature data at a duty-cycled processor.

Referring to FIG. 6, a particular embodiment of a method of performing sound recognition on audio feature data at a duty-cycled processor is shown and generally designated 600. In an illustrative embodiment, the method 600 may be performed by the processor 150 of FIG. 1 or the processor 230 of FIG. 2.

The method 600 may include transitioning out of a low-power state at a processor during a duty cycle of the processor, at 602. In a particular embodiment, the processor may be a digital signal processor (DSP) having a 10% duty cycle. For example, in FIG. 2, the processor 230 may transition out of a low-power state during a duty cycle (e.g., a transition from idle to active).

The method 600 may also include retrieving audio feature data from a buffer, where the audio feature data indicates features of audio data received during the low-power state of the processor. When the processor is operating in a store-and-forward mode, the audio feature data may correspond to a plurality of audio frames, at 604. Alternately, when the processor is operating in a direct transfer mode, the audio feature data may correspond to a single audio frame, at 606. For example, in FIG. 2, the processor may retrieve the extracted audio features 226 from the buffer 227.

The method 600 may further include transforming the retrieved audio feature data to generate transformed audio feature data, at 608, and performing one or more sound recognition operations on the transformed audio feature data, at 610. In a particular embodiment, the audio feature data may be transformed via a discrete cosine transform (DCT) transformer and the resulting transformed audio feature data may include a plurality of mel-frequency cepstral coefficients (MFCCs). For example, in FIG. 2, the transformer 233 may transform the retrieved audio features 226 to generate the transformed audio feature data 234, and one or more of the sound recognition modules 241-245 may perform one or more sound recognition operations (e.g., listen location, continuous audio fingerprinting, continuous keyword detection, target sound detection, and/or novelty detection) on the transformed audio feature data 234.

The method 600 may include determining whether to activate an application processor and/or a portion of a mobile station modem, or other component, based on a result of the one or more sound recognition operations, at 612, prior to transitioning back to the low-power state, at 614. For example, in FIG. 2, the processor 230 may determine, based on analysis performed by one or more of the sound recognition modules 241-245, whether to activate an application processor and/or a portion of a mobile station modem prior to transitioning back into the low-power state.

In particular embodiments, the method 600 of FIG. 6 may be implemented via hardware (e.g., a field-programmable gate array (FPGA) device, an application-specific integrated circuit (ASIC), etc.) of a processing unit such as a central processing unit (CPU), a digital signal processor (DSP), or a controller, via a firmware device, or any combination thereof. As an example, the method 600 of FIG. 6 can be performed by a processor that executes instructions, as described with respect to FIG. 10.

Figure 7:
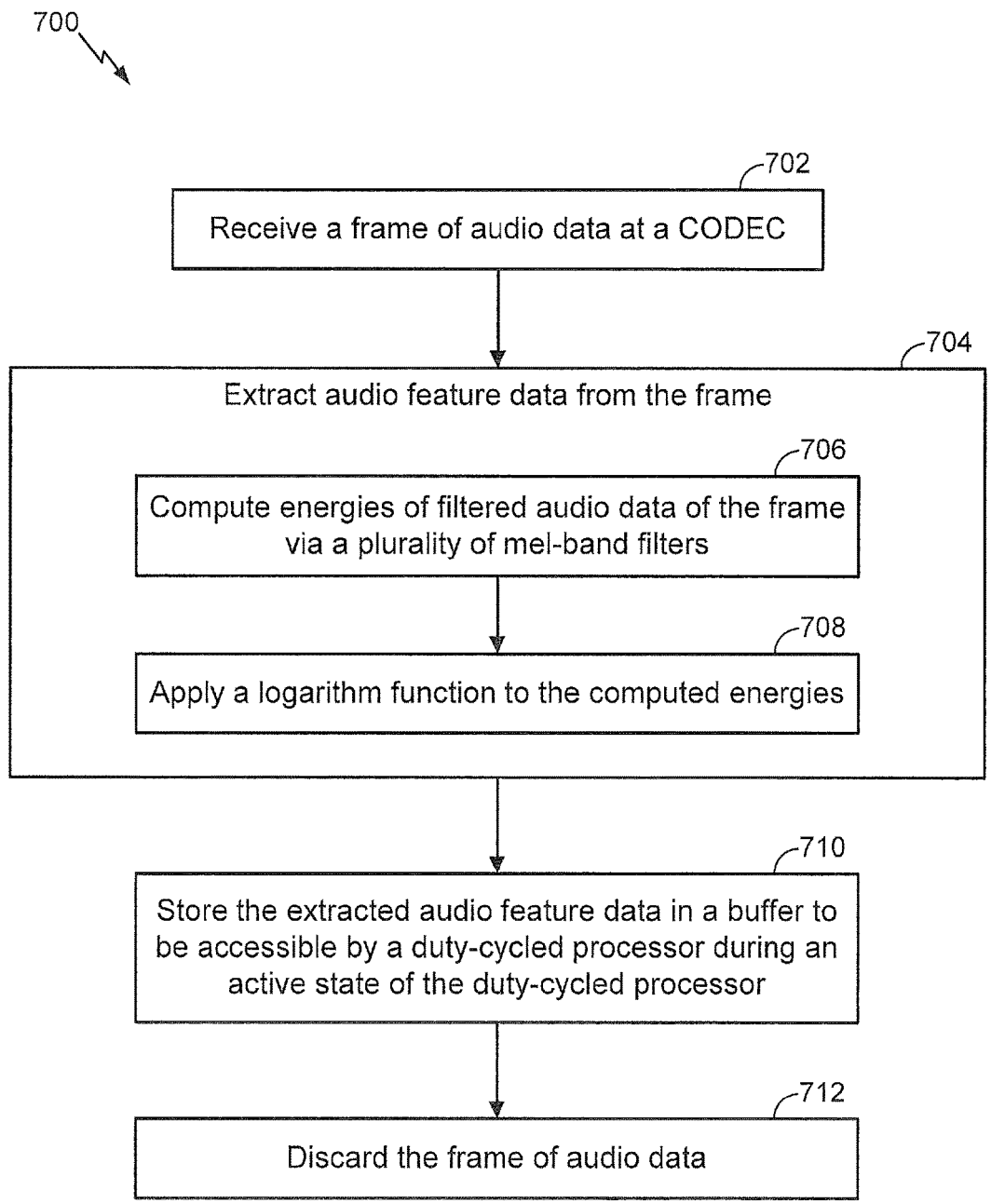
FIG. 7 is a flowchart to illustrate a particular embodiment of a method of extracting audio feature data at a CODEC.

Referring to FIG. 7, a particular embodiment of a method of extracting audio feature data at a CODEC is shown and generally designated 700. In an illustrative embodiment, the method 700 may be performed by the CODEC 120 of FIG. 1 or the CODEC 220 of FIG. 2.

The method 700 may include receiving a frame of audio data at a CODEC, at 702. For example, in FIG. 2, the CODEC 220 may receive a frame of the audio data 212. The method 700 may also include extracting audio feature data from the frame, at 704. To illustrate, extracting audio feature data may include computing energies of filtered audio data of the frame via a plurality of mel-band filters, at 706, and applying a logarithm function to the computed energies, at 708. For example, in FIG. 2, the feature extractor 222 may filter the audio data 212 using the filters 223 to generate the energies 224 of filtered audio data and may apply a logarithm function using the log converter 225 to generate the extracted audio features 226.

The method 700 may further include storing the extracted audio feature data in a buffer to be accessible by a duty-cycled processor during an active state of the duty-cycled processor, at 710, and discarding the frame of audio data, at 712. For example, in FIG. 2, the extracted audio features 226 may be stored in the buffer 227 and the frame of the audio data 212 may be discarded by the CODEC 220. The method 700 may be repeated for subsequent frames of audio received by the CODEC while the duty-cycled processor is in a low-power state.

In particular embodiments, the method 700 of FIG. 7 may be implemented via hardware (e.g., a field-programmable gate array (FPGA) device, an application-specific integrated circuit (ASIC), a controller, etc.) of a CODEC, via a firmware device, or any combination thereof. As an example, the method 700 of FIG. 7 can be performed by a CODEC (or processor therein) that executes instructions, as described with respect to FIG. 10.

Figure 8:
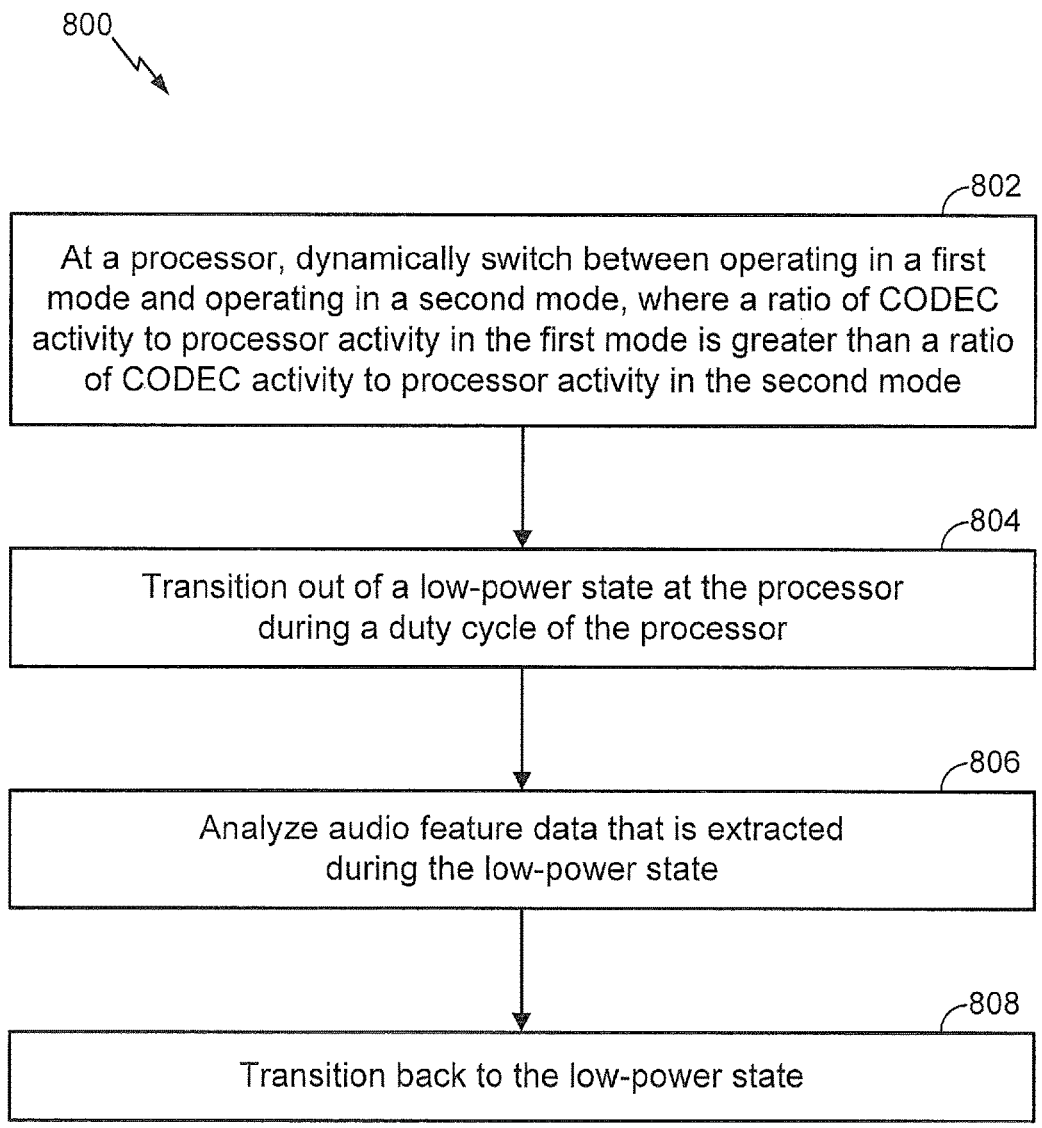
FIG. 8 is a flowchart to illustrate a particular embodiment of a method of dynamically switching between operating in a store-and-forward mode and in a direct transfer mode at a processor.

Referring to FIG. 8, a particular embodiment of a method of dynamically switching between operating in a store-and-forward mode and in a direct transfer mode at a processor is shown and generally designated 800. In an illustrative embodiment, the method 800 may be performed by the processor 150 of FIG. 1 or by the processor 230 of FIG. 2.

The method 800 may include, at a processor, dynamically switching between operating in a first mode and operating in a second mode based on an application context of the processor, at 802. A ratio of CODEC activity to processor activity in the first mode may be greater than a ratio of CODEC activity to processor activity in the second mode. For example, in FIG. 2, the dynamic mode-switching logic 232 may dynamically switch operation of the processor 230 between various modes based on an application context of the processor 230. Similar dynamic mode-switching logic may also be present in the CODEC 220 of FIG. 2. Alternatively, dynamic mode-switching logic that controls both the CODEC 220 and the processor 230 of FIG. 2 may be in an external component (e.g., integrated into a controller). The method 800 may also include transitioning out of a low-power state at the processor during a duty cycle of the processor, at 804. For example, in FIG. 2, the processor 230 may transition out of a low-power state during a duty cycle.

The method 800 may include analyzing the retrieved audio feature data, at 806, and transitioning back to the low-power state, at 808. For example, in FIG. 2, one or more of the sound recognition modules 441-445 may analyze the retrieved audio feature data prior to the processor 230 transitioning back to the low-power state. In a particular embodiment, the processor 230 may also determine whether or not to activate other system components, such as an application processor and/or portion of a mobile station modem (MSM) based on the analysis. For example, the processor 230 may generate an activation signal based on the analysis, as described with reference to the activation signal 160 of FIG. 1.

In particular embodiments, the method 800 of FIG. 8 may be implemented via hardware (e.g., a field-programmable gate array (FPGA) device, an application-specific integrated circuit (ASIC), etc.) of a processing unit such as a central processing unit (CPU), a digital signal processor (DSP), or a controller, via a firmware device, or any combination thereof. As an example, the method 800 of FIG. 8 can be performed by a processor that executes instructions, as described with respect to FIG. 10.

Figure 9:
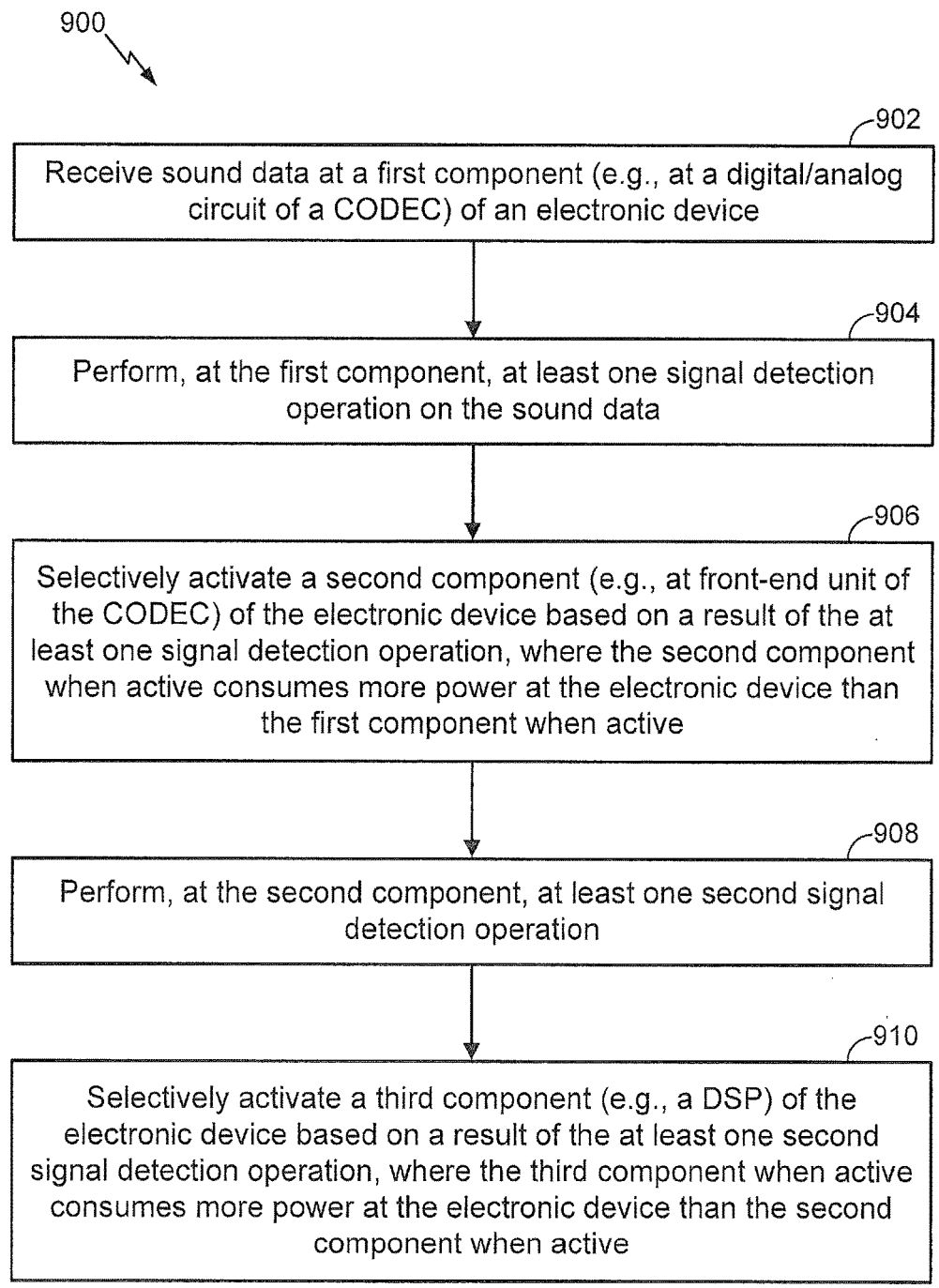
FIG. 9 is a flowchart to illustrate a particular embodiment of a method of performing staggered hierarchical activation of higher-power components of an electronic device by lower-power components of the electronic device.

Referring to FIG. 9, a particular embodiment of a method of performing staggered hierarchical activation of higher-power components of an electronic device by lower-power components of the electronic device is shown and generally designated 900. In an illustrative embodiment, the method 900 may be performed at the system 200 of FIG. 2.

The method 900 may include receiving sound data at a first component of an electronic device, at 902. The first component may be at a digital/analog circuit of a CODEC. For example, in FIG. 2, the coarse detection/classification block 290 may receive sound data. The method 900 may also include performing, at the first component, at least one signal detection operation on the sound data, at 904. For example, in FIG. 2, the coarse detection/classification block 290 may perform a signal detection operation (e.g., a RMS operation or a band-power operation) to determine whether the sound data includes audio, beacon, or ultrasound data.

The method 900 may further include selectively activating a second component of the electronic device based on a result of the at least one signal detection operation, at 906. The second component when active may consume more power at the electronic device than the first component when active. In a particular embodiment, the second component may be at a front-end unit of the CODEC. For example, in FIG. 2, the coarse detection/classification block 290 may selectively activate the fine detection/classification block 296 via the first activation signal 294.

The method 900 may include performing, at the second component, at least one second signal detection operation, at 908. The method 900 may include selectively activating a third component of the electronic device based on a result of the at least one second signal detection operation. The third component when active may consume more power at the electronic device than the second component when active. In a particular embodiment, the third component may be incorporated into a DSP. For example, in FIG. 2, the fine detection/classification block 296 may selectively activate a final detection/classification block at the processor 230 via the second activation signal 298.

In particular embodiments, the method 900 of FIG. 9 may be implemented via hardware (e.g., a field-programmable gate array (FPGA) device, an application-specific integrated circuit (ASIC), etc.) of a processing unit such as a central processing unit (CPU), a digital signal processor (DSP), or a controller, via a firmware device, or any combination thereof. As an example, the method 900 of FIG. 9 can be performed by a processor that executes instructions, as described with respect to FIG. 10.

Figure 10:
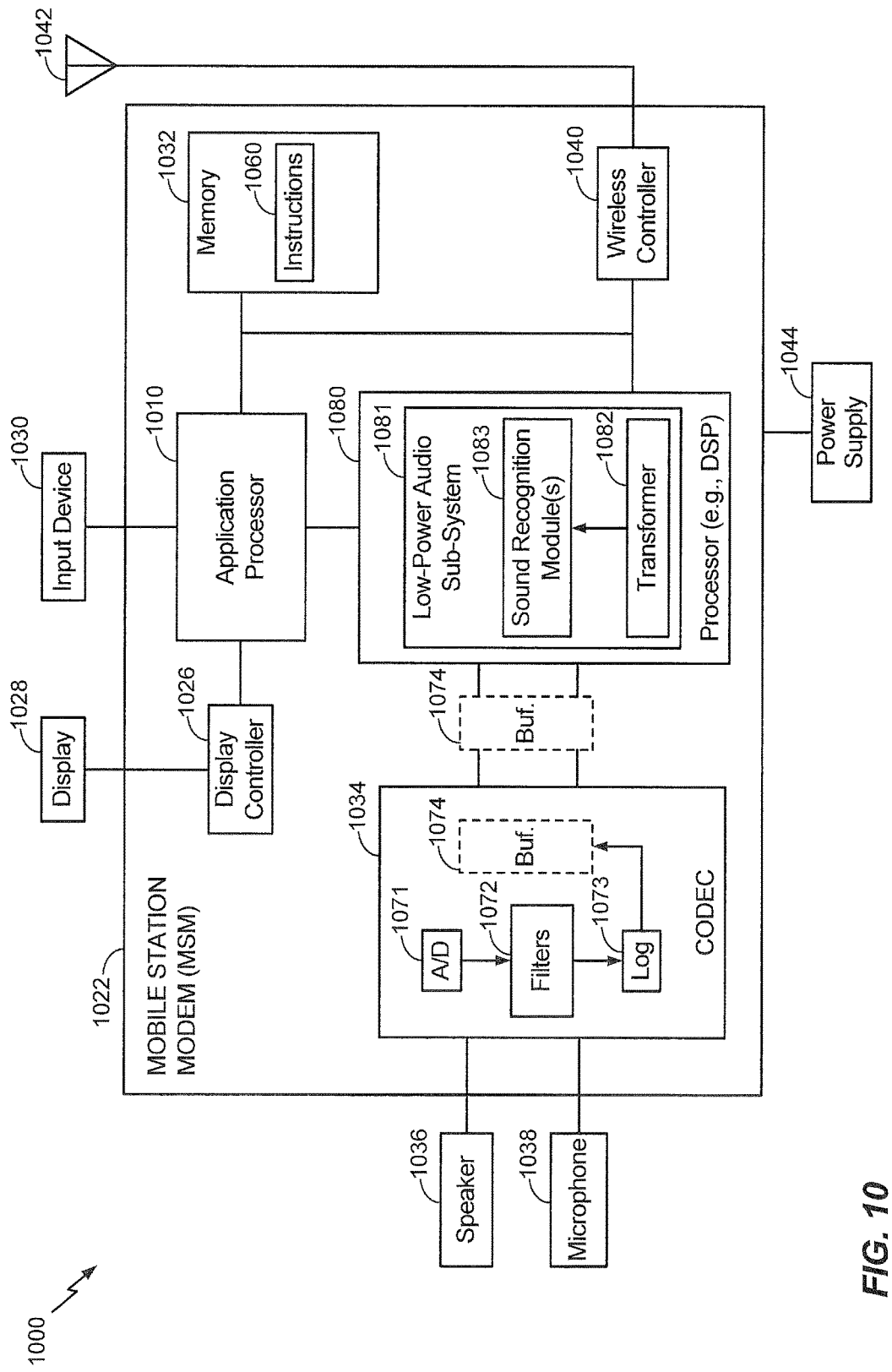
FIG. 10 is a block diagram of a wireless device operable to extract and analyze audio feature data in accordance with the systems and methods of FIGS. 1-9.

Referring to FIG. 10, a block diagram of a particular illustrative embodiment of a wireless communication device is depicted and generally designated 1000. The device 1000 includes an application processor 1010 and a digital signal processor (DSP) 1080, both of which are coupled to a memory 1032. In an illustrative embodiment, the DSP 1080 may be the processor 150 of FIG. 1 or the processor 230 of FIG. 2. The memory 1032 may include instructions 1060 executable by the DSP 1010 to perform methods and processes disclosed herein, such as the method 600 of FIG. 6 and the method 800 of FIG. 8. The instructions may also be executable by a coder/decoder (CODEC) 1034 to perform methods and processes disclosed herein, such as the method 700 of FIG. 7. The instructions may also be executable by the CODEC 1034 and the DSP 1080 to perform the method 900 of FIG. 9.

FIG. 10 also shows a display controller 1026 that is coupled to the application processor 1010 and to a display 1028. The CODEC 1034 may be coupled to the DSP 1080, as shown. A speaker 1036 and a microphone 1038 can be coupled to the CODEC 1034. For example, the microphone 1038 may be the microphone 210 of FIG. 2. FIG. 10 also indicates that a wireless controller 1040 can be coupled to the processors 1010, 1080 and to a wireless antenna 1042.

The CODEC 1034 may include an analog-to-digital converter (ADC) 1071, a plurality of filters 1072, and a log converter 1073. For example, the ADC 1071 may be the ADC 221 of FIG. 2, the filters 1072 may be the filters 223 of FIG. 2, and the log converter 1073 may be the log converter 225 of FIG. 2. In a particular embodiment, the CODEC 1034 may also include a buffer 1074 (e.g., as described with reference to the buffer 227 of FIG. 2). Alternately, the buffer 1074 may be external to the CODEC 1034 and to the DSP 1080 (e.g., as described with reference to the buffer 140 of FIG. 1). The DSP 1080 may include a transformer 1082 (e.g., the transformer 233 of FIG. 2) and one or more sound recognition modules 1083 (e.g., the sound recognition modules 241-245 of FIG. 2) configured to perform one or more sound recognition operations. In a particular embodiment, the transformer 1082 and the sound recognition module(s) 1083 may be included in a low-power audio sub-system (LPASS) 1081 of the DSP 1080.

In a particular embodiment, the processors 1010, 1080, the display controller 1026, the memory 1032, the CODEC 1034, and the wireless controller 1040 are included in a system-in-package or system-on-chip device (e.g., a mobile station modem (MSM)) 1022. In a particular embodiment, an input device 1030, such as a touchscreen and/or keypad, and a power supply 1044 are coupled to the system-on-chip device 1022. Moreover, in a particular embodiment, as illustrated in FIG. 10, the display 1028, the input device 1030, the speaker 1036, the microphone 1038, the wireless antenna 1042, and the power supply 1044 are external to the system-on-chip device 1022. However, each of the display 1028, the input device 1030, the speaker 1036, the microphone 1038, the wireless antenna 1042, and the power supply 1044 can be coupled to a component of the system-on-chip device 1022, such as an interface or a controller.

In conjunction with the described embodiments, an apparatus is disclosed that includes means for receiving one or more frames of audio data. For example, the means for receiving may include the CODEC 120 of FIG. 1, the microphone 210 of FIG. 2, the microphone 310 of FIG. 3, the microphone 1038 of FIG. 10, one or more devices configured to receive frames of audio data, or any combination thereof. The apparatus may also include means for filtering the one or more frames of audio data to produce filtered audio data independent of whether a processor is in a low-power state or in an active state. For example, the means for filtering may include the CODEC 120 of FIG. 1, the filters 223 of FIG. 2, the filters 323 of FIG. 3, the filters 1072 of FIG. 10, one or more devices configured to filter frames of audio data, or any combination thereof.

The apparatus may further include means for generating audio feature data based on the energies of the filtered audio data. For example, the means for generating may include the CODEC 120 of FIG. 2, the log converter 225 of FIG. 2, the log converter 325 of FIG. 3, the log converter 1073 of FIG. 10, one or more devices configured to generate audio feature data, or any combination thereof. The apparatus may include means for transforming the audio feature data to generate transformed data. For example, the means for transforming may include the processor 150 of FIG. 1, the transformer 233 of FIG. 2, the DCT 333 of FIG. 3, the transformer 1082 of FIG. 10, one or more devices configured to transform audio feature data, or any combination thereof.

The apparatus may also include means for performing one or more operations on the transformed data after the processor transitions out of the low-power state to the active state. For example, the means for performing may include the processor 150 of FIG. 1, one or more of the sound recognition modules 241-245 of FIG. 2, one or more of the sound recognition modules 340 of FIG. 3, one or more of the sound recognition module(s) 1083 of FIG. 10, one or more devices configured to perform operations on transformed data, or any combination thereof. The apparatus may further include means for buffering an output of at least one of the means for filtering, the means for generating, and the means for transforming. For example, the means for buffering may include the buffer 140 of FIG. 1, the buffer 227 of FIG. 2, a buffer at one or more of the buffering points 302-308 of FIG. 3, the buffer 1074 of FIG. 10, one or more devices configured to buffer data, or any combination thereof.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a non-transitory storage medium such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
receiving audio data at an active coder/decoder (CODEC) that is coupled to a processor, wherein:
the processor is configured to:
transition in and out of a low-power state at a first rate; and
operate in each of a first mode and a second mode,
a ratio of CODEC activity to processor activity in the second mode is less than a ratio of CODEC activity to processor activity in the first mode,
the CODEC is configured to operate at a second rate in the first mode,
the CODEC is configured to operate at a third rate in the second mode,
the second rate and the third rate are each greater than the first rate, and
the audio data is received at the CODEC while the processor is in the low-power state; and
after the processor transitions out of the low-power state, retrieving buffered audio data corresponding to a plurality of audio frames from a buffer, the buffered audio data indicative of features of the audio data.

2. The method of claim 1, further comprising:
transforming the buffered audio data;
performing one or more sound recognition operations on the transformed buffered audio data; and
transitioning back to the low-power state after performing the one or more sound recognition operations.

3. The method of claim 2, wherein transforming the buffered audio data comprises generating a plurality of mel-frequency cepstral coefficients.

4. The method of claim 2, wherein the one or more sound recognition operations include a keyword detection operation.

5. The method of claim 2, wherein the processor is integrated into a wireless device, and further comprising determining whether to activate at least a portion of a mobile station modem of the wireless device based on a result of the one or more sound recognition operations.

6. The method of claim 2, further comprising providing results of the one or more sound recognition operations to one or more applications in response to detecting a keyword in the transformed buffered audio data.

7. The method of claim 1, wherein the processor retrieves the buffered audio data from the buffer, and further comprising determining to activate an application processor in response to detecting a keyword in the retrieved buffered audio data.

8. The method of claim 1, further comprising:
storing the buffered audio data in the buffer while the processor is in the low-power state.

9. The method of claim 1, further comprising determining whether to operate the processor in the first mode or in the second mode based on an application context of the processor.

10. The method of claim 1, wherein the CODEC is configured to, during the first mode, to be on while the processor is cycled at the first rate.

11. The method of claim 1, wherein the second rate and the third rate each correspond to an on condition of the CODEC.

12. The method of claim 1, wherein:
the buffered audio data includes audio feature data,
while the processor is in the low-power state, the audio feature data is extracted from the audio data and stored in the buffer, and
after the processor transitions from the low-power state, the processor retrieves the buffered audio data from the buffer and processes the retrieved buffered audio data.

13. The method of claim 1, wherein the processor retrieves and processes the buffered audio data prior to transitioning back into the low-power state.

14. The method of claim 1, wherein:
the processor transitions out of the low-power state in response to expiration of a programmable time period;
in a store-and-forward mode, the programmable time period is less than or equal to a maximum time period that is determined based on a size of the buffer; and
in a direct transfer mode, the programmable time period is independent of the size of the buffer.

15. The method of claim 1, further comprising, while the processor is in the low-power state, performing by the CODEC:
filtering the audio data via a plurality of filters;
computing energies of filtered audio data from each of the plurality of filters;
applying a logarithm function to the computed energies to generate the buffered audio data;
storing the buffered audio data in the buffer; and
discarding the audio data.

16. The method of claim 1, wherein the buffer is internal to the CODEC.

17. The method of claim 1, wherein the buffer is external to the CODEC and external to the processor.

18. The method of claim 1, wherein:
the audio data is received from a microphone or from an analog-to-digital converter (ADC) at the CODEC, and
the processor transitions in and out of the low-power state based on a programmable cycle.

19. A method comprising:
receiving frames of audio data at an active coder/decoder (CODEC) that is coupled to a processor, wherein:
the processor configured to:
transition in and out of a first state at a first rate; and
operate in each of a first mode and a second mode;
a ratio of CODEC activity to processor activity in the second mode is less than a ratio of CODEC activity to processor activity in the first mode,
the CODEC is configured to operate at a second rate in the first mode;
the CODEC is configured to operate at a third rate in the second mode,
the second rate and the third rate are each greater than the first rate, and
the frames of audio data are received at the CODEC while the processor is in the first state; and
while the processor is in the first state, storing audio data corresponding to one or more of the frames of audio data in a buffer to be accessible by the processor during a second state.

20. The method of claim 19, further comprising applying an analog-to-digital converter of the CODEC to the frames of audio data.

21. The method of claim 19, further comprising:
filtering the frames of audio data via a plurality of filters;
computing energies of filtered audio data from each of the plurality of filters; and
applying a logarithm function to the computed energies to generate audio feature data.

22. The method of claim 19, wherein:
the frames of audio data are received from a microphone or from an analog-to-digital converter (ADC) at the CODEC, and the processor transitions in and out of the first state according to a fixed cycle.

23. The method of claim 19, further comprising:
extracting audio feature data from data corresponding to the frames of audio data; and
discarding the frames of audio data after extracting the audio feature data.

24. An apparatus, comprising:
a processor configured to;
   transition in and out of a low-power state at a first rate; and to
   operate in each of a first mode and a second mode;
a component configured to:
   buffer frames of audio data when the processor is in the low-power state, wherein:
      a ratio of component activity to processor activity is greater in the first mode than in the second mode;
   operate at a second rate in the first mode; and
   operate at a third rate in the second mode, wherein:
      the second rate and the third rate are each greater than the first rate; and
a transformer configured to apply a transform function to the audio data to generate transformed data, wherein:
   the processor is further configured to perform one or more operations on the transformed data after transitioning out of the low-power state.

25. The apparatus of claim 24, further comprising a buffer configured to store the buffered frames of audio data.

26. The apparatus of claim 25, wherein the buffer comprises random access memory (RAM), and further comprising:
an antenna; and
a receiver coupled to the antenna and configured to receive a signal corresponding to the audio data.

27. The apparatus of claim 26, wherein the processor, the component, the transformer, the buffer, the receiver, and the antenna are integrated into a mobile device.

28. The apparatus of claim 24, further comprising:
a coder/decoder (CODEC); and
a plurality of filters and a log converter integrated into the CODEC, the plurality of filters configured to filter one or more of the frames of audio data to produce energies of filtered audio data and the log converter configured to apply a logarithm function to the energies of the filtered audio data to generate audio features.

29. The apparatus of claim 24, wherein the transformer comprises a discrete cosine transformer that is integrated into the processor, and wherein the processor is integrated into a wireless device.

30. An apparatus comprising:
a processor, the processor configured to:
   transition in and out of a low-power state at a first rate;
   operate in each of a first mode and a second mode;
   retrieve buffered data corresponding to a plurality of audio frames from a buffer after transitioning out of the low-power state of the first mode, the buffered data indicative of features of audio data; and
   analyze the buffered data; and
an active coder/decoder (CODEC), the CODEC including the buffer and configured to:
   receive audio data;
   buffer data corresponding to the received audio data to the buffer while the processor is in the low-power state;
   operate at a second rate in the first mode; and
   operate at a third rate in the second mode, wherein:
      the second rate and the third rate are each greater than the first rate, and
      a ratio of CODEC activity to processor activity in the second mode is less than a ratio of CODEC activity to processor activity in the first mode.

31. The apparatus of claim 30, wherein the CODEC is configured to during the first mode, be on while the processor is cycled at the first rate.

32. The apparatus of claim 30, wherein:
the processor is configured to switch between the first mode and the second mode based on an application context of the processor, the application context associated with execution of an application, and
execution of the application includes keyword detection.

33. The apparatus of claim 30, wherein the CODEC is configured to extract audio feature data from the received audio data and to store the extracted audio feature data in the buffer.

34. The apparatus of claim 30, wherein the buffered data corresponds to an audio signal received from a microphone or from an analog-to-digital converter (ADC) at the CODEC, and wherein the processor is configured to transition out of the low-power state in response to expiration of a programmable time period.

35. An apparatus comprising:
means for receiving frames of audio data, the means for receiving including:
   means for buffering the frames of audio data when a processor is in a first state, wherein:
      the processor is configured to:
         transition in and out of the first state at a first rate; and
         operate in each of a first mode and a second mode,
      a ratio of activity of the means for receiving to activity of the processor is greater in the first mode than in a second mode of the processor,
      the means for receiving is configured to operate at a second rate in the first mode,
      the means for receiving is configured to operate at a third rate in the second mode, and
      the second rate and the third rate are each greater than the first rate;
means for transforming the audio data to generate transformed data; and
means for performing one or more operations on the transformed data after the processor transitions from the first state to a second state.

36. The apparatus of claim 35, wherein:
the means for buffering is configured to store an output of at least one of means for filtering, means for generating, or means for transforming,
the first state is a low-power state of the processor, and
the means for buffering, the means for transforming, and the means for performing are integrated into a wireless device.

37. A non-transitory processor-readable medium comprising instructions that, when executed by a processor, cause the processor to:
switch between operating in a first mode and operating in a second mode;
transition in and out of a low-power state at a first rate, wherein:
   a ratio of coder/decoder (CODEC) activity to processor activity in the first mode is greater than a ratio of CODEC activity to processor activity in the second mode;

the CODEC is configured to operate at a second rate in the first mode, the CODEC is configured to operate at a third rate in the second mode, and the second rate and the third rate are each greater than the first rate; and analyze buffered audio data corresponding to a plurality of audio frames, wherein:

the buffered audio data is extracted when the CODEC is active and the processor is in the low-power state.

38. The non-transitory processor-readable medium of claim 37, wherein the buffered audio data is extracted by the CODEC in a first time period, and wherein the processor is caused to analyze the buffered audio data in a second time period.

39. A method comprising receiving sound data at a first component of an electronic device, wherein:

the first component is configured to operate at a second rate in a first mode, the first component is configured to operate at a third rate in a second mode, and the second rate and the third rate are each greater than a first rate;

performing, at a second component of the electronic device while the second component is in an active state, at least one signal detection operation on the sound data, wherein:

the second component is configured to transition in and out of the active state at the first rate in each of the first mode and the second mode; and selectively activating a third component at the electronic device based on a result of the at least one signal detection operation, wherein:

a ratio of second component activity to first component activity is less in the first mode than in the second mode, and the second component is configured, in the active state, to retrieve buffered audio data corresponding to a plurality of audio frames from a buffer.

40. The method of claim 39, wherein:

the first component comprises a course detector/classifier at a coder/decoder (CODEC), and the at least one signal detection operation includes coarse signal detection and classification.

41. The method of claim 40, wherein:

the coarse signal detection and classification includes computing a probability that the buffered audio data matches a music or speech model, the second component comprises a fine detector/classifier configured to perform fine signal detection and classification based on data corresponding to the audio data, and the second component when active consumes less power at the electronic device than the third component when active.

42. The method of claim 39, wherein the second component comprises a processor of the electronic device.

43. The method of claim 39, further comprising:

performing, at the first component, at least one second signal detection operation; and selectively activating the second component of the electronic device based on a result of the at least one second signal detection operation.

44. The method of claim 39, wherein the at least one signal detection operation comprises a keyword detection operation.

* * * * *